US005764857A

United States Patent [19]

Suzuki

[11] Patent Number: 5,764,857
[45] Date of Patent: Jun. 9, 1998

[54] METHOD OF AND APPARATUS FOR GENERATING PROGRAM

[75] Inventor: Hideaki Suzuki, Wako, Japan

[73] Assignee: Honda Giken Kogyo Kabushiki Kaisha, Tokyo, Japan

[21] Appl. No.: 504,697

[22] Filed: Jul. 20, 1995

[30] Foreign Application Priority Data

Aug. 2, 1994  [JP]  Japan .................... 6-181076

[51] Int. Cl.$^6$ ................................. G06F 15/18
[52] U.S. Cl. ................................. 395/13
[58] Field of Search ................................. 395/13

[56] References Cited

U.S. PATENT DOCUMENTS

| | | | |
|---|---|---|---|
| 5,048,095 | 9/1991 | Bhanu et al. | 395/13 |
| 5,136,686 | 8/1992 | Koza | 395/13 |
| 5,140,530 | 8/1992 | Guha et al. | 395/13 |
| 5,148,513 | 9/1992 | Koza et al. | 395/13 |
| 5,255,345 | 10/1993 | Shaefer | 395/13 |
| 5,343,554 | 8/1994 | Koza et al. | 395/13 |
| 5,390,283 | 2/1995 | Eshelman et al. | 395/13 |

FOREIGN PATENT DOCUMENTS

| | | |
|---|---|---|
| 4204078 | 8/1992 | Germany . |
| 9205497 | 4/1992 | WIPO . |

OTHER PUBLICATIONS

Proceedings of the International Conference on Neural Networks, entitled "Genetic Algorithms and Simulated Annealing A Marriage Proposal", dated Mar. 28, 1993.

J.C. Smart and V. Vemuri, "A–Vu: Visualization Tool for Complex Software Systems," 1992 Symp. on Assessment of Quality Software Development Tools, pp. 172–182, May 1992.

V. Petridis and S. Karalis, "Varying Quality Function in Genetic Algorithms and the Cutting Problem," 1994 Conf. on Evolutionary Computation, pp. 166–169 Jun. 1994.

H. Muller et al., "Genetic Programming and Simulated Annealing for Optimization of Unit Commitment," Proc. 11th Power Systems Computation Conf., pp. 1097–1103, Dec. 1993.

Primary Examiner—Robert W. Downs
Attorney, Agent, or Firm—Lyon & Lyon LLP

[57] ABSTRACT

A plurality of programs are generated which are each composed of an arrangement of basic instructions of plural types required to generate output data with respect to given input data of given types. Each of the programs is executed with a computer until a predetermined condition is satisfied, and the input data is given to the computer. Output data generated with respect to the input data when each of the programs is executed is compared with reference output data predetermined with respect to the input data, and an energy value indicative of the quality level of each of the programs is incremented or decremented such that the energy value is greater as the degree with which the generated output data and the reference output data agree with each other is higher. Each of the programs is copied or eliminated depending on the magnitude of the energy value after the execution of each of the programs by the computer is finished, and the programs are crossed and mutated with a predetermined probability. The above steps of executing, incrementing or decrementing, copying or eliminating, crossing, and mutating are repeated to generate a program for generating output data with respect to the input data with a high degree of agreement with the reference output data.

32 Claims, 6 Drawing Sheets

METHOD OF AND APPARATUS FOR GENERATING PROGRAM

BACKGROUND OF THE INVENTION

1. Field of the Invention

The present invention relates to a method of and an apparatus for generating a program.

2. Description of the Related Art

Programs for generating output data (answers) with respect to input data (problems) have heretofore been used and demanded in various industrial fields.

For example, to control the operation of a machine such as a robot with a computer, there is used a control program for generating output data, i.e., data representative of a control quantity for an actuator, to determine how to operate the machine with respect to input data, i.e., data obtained from various sensors or the like.

Predicting future stock prices with a computer requires a program for generating output data representative of predicted future stock prices from input data representative of present or past stock prices.

The programs of the above kind are basically in the form of a mere sequence of plural basic instructions including arithmetic instructions, decision branch instructions, assignment instructions, input and output instructions (instructions to read input data and instructions to write output data). It is the current practice to rely on manual efforts of programmers for generating such programs, i.e., for carrying out programming.

A programmer generates a program usually by determining an algorithm therefor and thereafter arranging basic instructions according to the algorithm. An algorithm differs depending on the type of a problem, and there are generally various algorithms available for solving a problem because a sole algorithm is not necessarily formulated for such a problem. Many of such algorithms for solving the problem are not necessarily clear at the time a program is generated for the problem. Even when an algorithm is determined, basic instructions according to the algorithm may not necessarily be arranged in a sole formulated sequence.

Heretofore, while part of programs or some programs of limited types may be generated in a formulated fashion with a computer, it has been customary to generate most other programs based on programmer's manual programming efforts.

Since the conventional programming practice relies highly on programmer's manual efforts, it requires a long period of working time and the cost of programming is high. Such drawbacks grow worse as a program to be generated is more complex. The quality of a generated program depends basically on the ability of the programmer. Any program better than the generated program cannot be generated by the programmer as it exceeds the ability of the programmer.

SUMMARY OF THE INVENTION

It is therefore an object of the present invention to provide a method of and an apparatus for generating a program of high quality for producing output data with respect to input data, while greatly reducing programmer's manual efforts.

To achieve the above object, there is provided in accordance with the present invention an apparatus for generating a program, comprising:

program storing means for storing a plurality of programs each composed of an arrangement of basic instructions of plural types required to generate output data with respect to given input data of given types;

energy value storing means for storing data indicative of an energy value indicative of the quality level of each of the programs;

a computer for executing each of the programs until a predetermined condition is satisfied;

input data imparting means for giving the input data to the computer when the computer executes each of the programs;

energy value setting means for setting an energy value to increment or decrement the energy value corresponding to each of the programs which is stored in the energy value storing means depending on the degree with which the output data generated by each of the programs executed by the computer and reference output data predetermined with respect to the input data agree with each other;

selecting means for copying or eliminating each of the programs depending on the magnitude of the energy value stored in the energy value storing means and storing a plurality of programs generated by copying or eliminating each of the programs into the program storing means, after the execution of each of the programs by the computer is finished;

crossing means for crossing the programs stored in the program storing means with a predetermined probability; and mutating means for mutating the programs stored in the program storing means with a predetermined probability;

the energy value setting means having means for setting the energy value corresponding to each of the programs so as to increment the energy value when the degree with which the generated output data and the reference output data agree with each other is higher;

the computer, the selecting means, the crossing means, and the mutating means having respective means for repeatedly executing each of the programs, copying or eliminating each of the programs, crossing the programs, and mutating each of the programs to generate a program for generating output data with respect to the input data with a high degree of agreement with the reference output data, in the programs stored in the program storing means.

With the above apparatus, when each of the programs stored in the program storing means is executed by the program, the energy value stored in the energy value storing means is incremented by the energy value setting means in association with the program which generates output data with respect to the input data given by the input data imparting means with a high degree of agreement with the reference output data. Specifically, in a group composed of the programs, each of the programs gains a higher energy value if it can generate more accurate output data (an answer) with respect to given input data (a problem). Therefore, when each of the programs is copied or eliminated by the selecting means depending on the magnitude of an energy corresponding to each of the programs, inferior programs are deleted from the group, and a group composed of more superior programs is produced in the program storing means.

Programs better than those programs which were most superior in the original group cannot be generated by merely copying or eliminating programs with the selecting means. According to the present invention, programs in the group are crossed (mated) by the crossing means, and mutated by the mutating means. The crossing of programs means exchanging portions of a pair of programs. Specifically, the crossing means comprises means for selecting at least a pair of programs as a crossing pair from the plurality of programs with a predetermined probability, and crossing the selected programs by exchanging a portion of an arrangement of basic instructions or a bit train of each of the selected programs with a predetermined probability. The mutating of programs means changing a basic instruction of a program to another basic instruction different therefrom. Specifically, the mutating means comprises means for mutating each of the programs by either changing a basic instruction of an arrangement of basic instructions of each of the programs to another basic instruction with a predetermined probability or inverting the value of a bit of a bit train of each of the programs with a predetermined probability.

The crossing and mutating means operate to generate programs better than those stored in the program storing means, as follows:

When the programs are crossed and mutated, it is possible to generate a new program which was not present in the original group. If the generated new program is better than the programs stored in the program storing means, the new program can gain a higher energy value when it is executed. The program is multiplied in the group when it is copied by the selecting means.

A program for generating output data with respect to the input data with a higher degree of agreement with the reference output data contains a group of basic instructions or a bit train (a functional block) which is indispensable or effective to generate the output data. The program with such a functional block is copied, rather than being eliminated, by the selecting means, i.e., is multiplied in the group.

In the mutating step, if the program is mutated at its functional block, then since the functional block is broken, the program with the broken functional block is eliminated by the selecting means. If the program is mutated at a portion thereof other than its functional block, then since the program remains, rather than being eliminated by the selecting means, the mutated portion remains in the program.

In the crossing step, corresponding portions of programs are exchanged. Therefore, when programs with respective functional blocks are crossed, the functional blocks are maintained without being damaged. At the same time, when programs with respective functional blocks are crossed, the functional blocks are maintained, and mutated portions accumulated in other portions of the programs than the functional blocks are crossed to generate new functional blocks in portions other than the maintained functional blocks. Inasmuch as the programs with such newly generated functional blocks are capable of generating more accurate output data, the programs are multiplied by the selecting means.

By thus repeatedly copying or eliminating, crossing, and mutating the programs depending on the energy values, it is possible to automatically generate, with the computer, better programs capable of generating output data with respect to the input data with a higher degree of agreement with the reference output data, in the group of programs stored in the program storing means.

A program which is not eliminated or weeded out by the selecting means, i.e., a program whose corresponding energy value is set so as to be incremented by the energy value setting means, contains as basic instructions an input data reading instruction for reading the input data and a processing completion instruction for indicating the generation of the output data, and a group of basic instructions including arithmetic and decision branch instructions between the input data reading instruction and the processing completion instruction. The position of the group of basic instructions in each of the programs may not necessarily be determined, and the group of basic instructions may be included in a plurality of positions in each of the programs. The group of basic instructions in each of the programs may be capable of generating output data with respect to certain particular input data with a high degree of agreement with the reference output data, but may not necessarily generate output data with respect to other input data of the same type with a high degree of agreement with the reference output data. When certain particular input data is given to the program with the group of basic instructions upon execution of the program, a high energy value is established for the program by the energy value setting means when the processing completion instruction is executed. Since the program cannot generate accurate output data with respect to other input data, however, the program is not defined as a superior program, and should be weeded out quickly.

For executing each of the programs with the computer, the computer is able to execute the processing completion instruction (which may be one or more in number) contained in the program a number of times depending on the energy value at the time the program starts being executed. The input data imparting means gives new input data to the computer each time the processing completion instruction is executed. In this manner, a program with a high energy value upon start of its execution, i.e., a program which has generated accurate output data with respect to the input data when it has been executed in a preceding cycle, generates output data with respect to more input data when it is executed at present time. The energy value of the program is incremented or decremented depending on the degree with which the output data agrees with the reference output data.

Therefore, if the program is a superior program which contains only a group of basic instructions capable of generating output data with respect to various input data, then the program gains a higher energy value each time the processing completion instruction is executed, and remains in the group of programs. Any program which is not a superior program often fails to generate output data with respect to various input data, even if it temporarily gains a high energy value when certain particular input data is given, and its energy value is decremented. Consequently, an inferior program that is incapable of generating output data with respect to various input data is quickly weeded out or eliminated by the selecting means, and more superior programs are quickly generated in the group of programs.

A program which is executed in the manner described above may contain an arrangement of basic instructions which form an infinite loop, and the computer cannot finish the execution of such a program. It is therefore preferable to limit the number of times that the basic instructions of each of the programs are executed, and to finish the execution of the programs when the number of times that the basic instructions are executed reaches a predetermined number.

The programs should preferably be crossed by the crossing means and mutated by the mutating means when the number of programs copied by the selecting means, i.e., the number of programs which gain a relatively high energy value upon execution thereof, reaches a certain given number or more. This is because when the number of programs which gain a relatively high energy value is small in the group of programs, such programs may change to inferior programs through the crossing by the crossing means or the mutation by the mutating means, and hence are highly likely to be eliminated by the selecting means. When the number of programs which gain a relatively high energy value is increased, the probability that all those superior programs change to inferior programs through the crossing by the crossing means or the mutation by the mutating means is small, and hence those programs are highly likely to remain in the group of programs.

The apparatus according to the present invention further comprises address data storing means for storing address data representing an address of at least one of the basic instructions of each of the programs stored in the program storing means, the basic instructions including a jump instruction for shifting the execution of the program to the basic instruction at the address represented by the address data stored in the address data storing means when each of the programs is executed by the computer. The selecting means comprises means for copying or eliminating the address data stored in the address data storing means in association with each of the programs when each of the programs is copied or eliminated. The crossing means comprises means for crossing the address data stored in the address data storing means with a predetermined probability in association with the programs when the programs are crossed. The mutating means comprises means for mutating the address data stored in the address data storing means with a predetermined probability in association with each of the programs when each of the programs is mutated.

With this arrangement, when the computer executes the jump instruction during execution of each of the programs, the execution of the program is shifted to the basic instruction at the address represented by the address data stored in the address data storing means. Therefore, a train of basic instructions following the above address is processed as a subroutine by the computer. When the address data is copied or eliminated and crossed or mutated in association with each of the programs, it is possible to generate a program having a superior subroutine program for generating accurate output data.

According to the present invention, there is also provided a method of generating a program, comprising the steps of:

generating a plurality of programs each composed of an arrangement of basic instructions of plural types required to generate output data with respect to given input data of given types;

executing each of the programs with a computer until a predetermined condition is satisfied and giving the input data to the computer;

comparing output data generated with respect to the input data when each of the programs is executed, with reference output data predetermined with respect to the input data, and incrementing or decrementing an energy value indicative of the quality level of each of the programs such that the energy value is greater as the degree with which the generated output data and the reference output data agree with each other is higher;

copying or eliminating each of the programs depending on the magnitude of the energy value after the execution of each of the programs by the computer is finished;

crossing the programs with a predetermined probability; and mutating the programs with a predetermined probability;

the steps of executing, incrementing or decrementing, copying or eliminating, crossing, and mutating being repeated to generate a program for generating output data with respect to the input data with a high degree of agreement with the reference output data.

With the above method, as with the apparatus described above, when each of the programs is executed, the energy value is established therefor, each of the programs is copied or eliminated depending on the energy value thereof, and programs are crossed and mutated, it is possible to automatically generate, with the computer, better programs capable of generating accurate output data with respect to the input data. The programs are crossed and mutated in the same manner as the apparatus described above.

For executing each of the programs with the computer, the computer is able to execute the processing completion instruction contained in the program a number of times depending on the energy value at the time the program starts being executed. New input data is given to the computer each time the processing completion instruction is executed. In this manner, a program which is incapable of generating accurate output data with respect to various input data is quickly weeded out or eliminated, and only superior programs are quickly multiplied in the group of computers.

By limiting the number of times that the basic instructions of each of the programs are executed by the computer, and also finishing the execution of each of the programs when the above number of times reaches a predetermined number, a program containing an arrangement of basic instructions which form an infinite loop is prevented from being executed infinitely.

The steps of crossing and mutating comprising the step of crossing the programs and mutating the programs, respectively, when the number of copied programs reaches at least a predetermined number. Thus, superior programs are more likely to remain in the group of programs.

The step of generating comprises the step of establishing position data representing a position of at least one of the basic instructions of each of the programs in association with each of the programs. The basic instructions include a jump instruction for shifting the execution of the program to the basic instruction at the position represented by the position data established in the step of establishing when each of the programs is executed by the computer. The step of selecting comprises the step of copying or eliminating the position data in association with each of the programs when each of the programs is copied or eliminated. The step of crossing comprises the step of crossing the position data with a predetermined probability in association with the programs when the programs are crossed. The step of mutating comprises the step of mutating the position data with a predetermined probability in association with each of the programs when each of the programs is mutated. In this manner, it is possible to generate a program having a superior subroutine program for generating accurate output data.

With the present invention, therefore, it is possible to automatically generate, with a computer, superior programs for generating output data with respect to input data with a high degree of agreement with reference output data, in a group of programs. Since most of the process of generating such superior programs is carried out by the computer, any manual efforts required to generate such superior programs are greatly reduced. A program for generating output data (an answer) from input data (a problem) is basically composed of basic instructions including input and output instructions, decision branch instructions, arithmetic instructions, etc. Therefore, if such basic instructions are made available as basic instructions for programs, various programs can be generated irrespective of the type of input data. The crossing and mutating steps which play an important role for generating an arrangement of basic instructions effective to generate accurate output data are carried out in terms of probability. Therefore, the generation of such an arrangement of basic instructions does not depend on the human abilities, making it possible to generate superior programs which have heretofore not been achieved by human efforts. If the input data is regarded as a given problem and the output data as an answer to the problem, then since a program for generating the answer represents a process for solving the problem, the capability of generating a superior program which has heretofore not been achieved by human efforts signifies a possibility to find a new solution to a problem. Therefore, the principles of the present invention are also applicable to finding a new solution to a problem.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
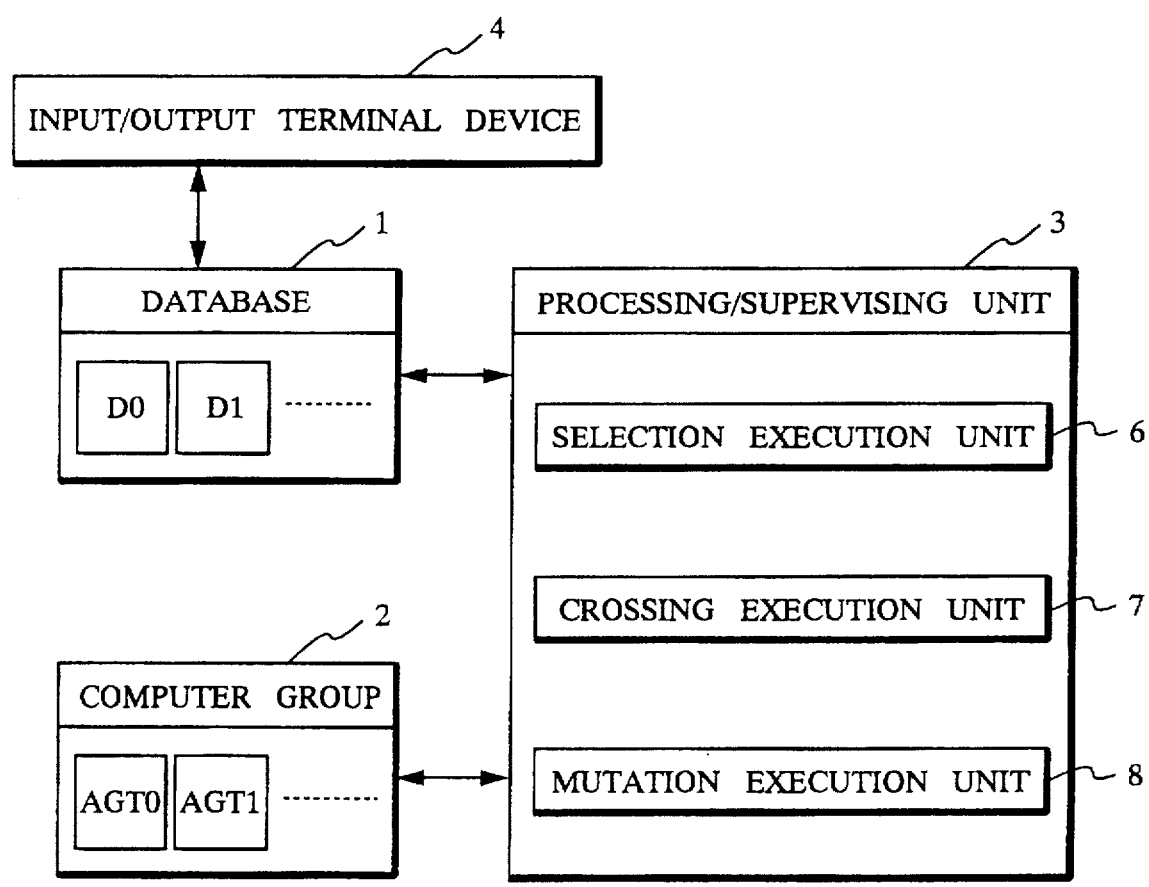
FIG. 1 is a block diagram of a system arrangement of an apparatus for generating a program according to the present invention.
Figure 2:
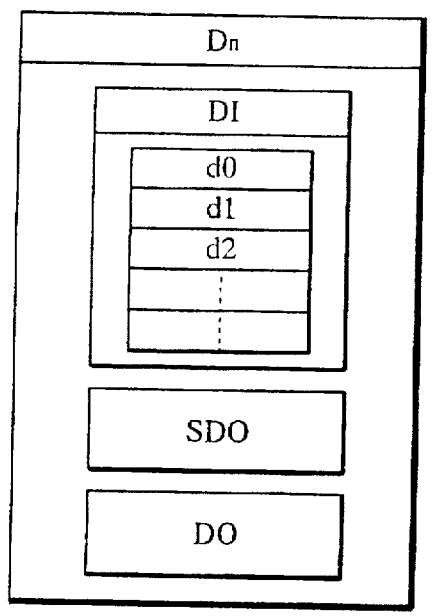
FIG. 2 is a block diagram of a portion of the apparatus shown in FIG. 1.

As shown in FIG. 1, an apparatus for generating a program according to the present invention comprises a data base (input data imparting means) 1 which stores a plurality of input data (problems) of the same type, a computer group 2 composed of computers $AGT_i$ (i=0, 1, ... ) for storing and executing a plurality of programs, respectively, to generate output data (answers) with respect to the input data stored in the data base 1, a processing/supervising unit 3 for processing and supervising data, e.g., transferring data between the computer group 2, and an input/output terminal device (energy value setting means) 4 for setting energy values indicative of the quality levels of the programs in the computer group 2. The processing/supervising unit 3 has, as its functions, a selection executing unit (selecting means) 6 for copying or eliminating programs, a crossing executing unit (crossing means) 7 for crossing programs, and a mutation executing unit (mutating means) 8 for mutating programs.

The data base 1 has a plurality of data storage areas $D_n$ (D=0, 1, ... ) each for storing, as one set of data, input data DI, reference output data SDO required with respect to the input data DI, and generated output data DO which is actually generated by a program with respect to the input data DI. The input data DI and the reference output data SDO are stored in advance in each of the data storage areas $D_n$, and differ from data storage area to data storage area. The input data DI stored in each of the data storage areas $D_n$ are composed of a plurality of partial input data $d_k$ (k=0, 1, ... ). A program to be generated by the apparatus according to the present invention is a program for generating output data DO from one set of input data DI composed of partial input data $d_k$.

Specifically, if a program for generating output data representing a control quantity for an actuator from detected data from a plurality of sensors is to be generated, then the detected data from the sensors are established as partial input data $d_k$. Data representing a control quantity for the actuator which is required with respect to the detected data from the sensors is established as reference output data SDO. Alternatively, if a program for generating output data representing an expected stock price for a next day from stock price data in past few days is to be generated, then the known stock price on a certain date in the past is established as reference output data SDO, and stock price data in few days prior to that date are established as partial input data $d_k$.

While each of the input data DI is one-dimensional data in this embodiment, the input data may be two-dimensional data or three-dimensional data depending on the type of a program to be generated.

Figure 3:
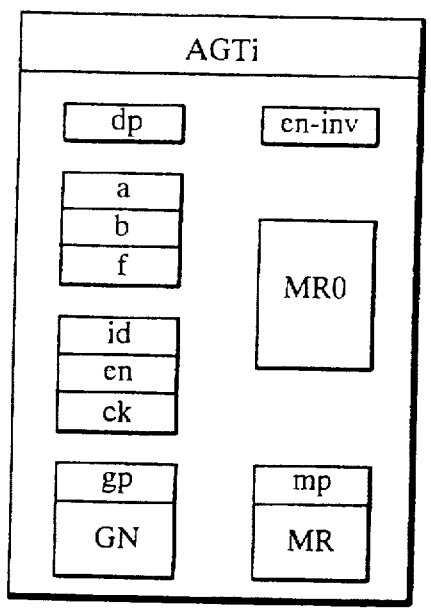
FIG. 3 is a block diagram of a portion of the apparatus shown in FIG. 1.

As shown in FIG. 3, each of the computers $AGT_i$ (i=0, 1, ... ) of the computer group 2 comprises memories GN, MR0, MR, and registers dp, a, b, f, id, en, ck, gp, mp, en-inv. The memory GN is a memory (program storing means) for storing a program. The memory MR0 is a memory (address data storing means) for storing a plurality address data indicative of addresses to store basic instructions of the program stored in the memory GN. The memory MR is a working memory for storing results of arithmetic operations that are carried out when a program stored in the memory GN is executed. Each of the computers $AGT_i$ will hereinafter be referred to as an agent $AGT_i$.

The register dp is a register for storing data indicative of storage addresses for the partial input data $d_k$ of each of the input data DI in the data base 1. The registers a, b are general-purpose registers used when arithmetic operations are carried out. The register f is a register for storing flag data. The register id is a register for storing identification codes of the respective agents $AGT_i$. The register en is a register (energy value storing means) for storing data indicative of an energy value which is established based on the program stored in the memory GN in a manner described later on. The register ck is a register for storing data indicative of the number of times that the basic instructions of the program are executed. The register gp is a register for storing address data of the memory GN which stores basic instructions that are to be successively executed by the agent AGTi during the execution of the program. The register mp is a register for storing address data of the memory MR. The register en-inv is a register for storing data representing the number of times that an fnsh instruction (processing completion instruction) contained in the program.

The basic instructions used in the apparatus for generating a program according to the present invention will be described below.

The basic instructions used in the apparatus for generating a program according to the present invention are basically decision branch instructions, assignment instructions, arithmetic instructions, input and output instructions, and processing completion instructions. Specifically, 25 basic instructions as shown in Table 1 below are used in the apparatus.

TABLE 1

|    | Names of basic instructions | Formulas representing the contents of basic instructions |
|----|-----|-----|
| 1  | ra·a | a ← 0 |
| 2  | xr·a | a ← a ⌐ 1 |
| 3  | sf·a | a ← a << 1 |
| 4  | de·a | a ← a − 1 |
| 5  | in·a | a ← a + 1 |
| 6  | m·ba | b ← a |
| 7  | a·ab | a ← a + b |
| 8  | s·ab | a ← a − b, f ← p, n, z |
| 9  | br·p | if p(f) = 1, gp ← gp + 2 |
| 10 | br·n | if n(f) = 1, gp ← gp + 2 |
| 11 | br·z | if z(f) = 1, gp ← gp + 2 |
| 12 | m·am | a ← mp |
| 13 | m·ma | mp ← a |
| 14 | de·m | mp ← mp − 1 |
| 15 | in·m | mp ← mp + 1 |
| 16 | m·Ma | MR[mp] ← a |
| 17 | ftch | gp ← MR[mp], mp ← mp + 1 |
| 18 | oprd | a ← MR[mp], mp ← mp + 1 |
| 19 | m·ad | a ← dp |
| 20 | m·da | dp ← a |
| 21 | de·d | dp ← dp − 1 |
| 22 | in·d | dp ← dp + 1 |
| 23 | read | a ← DI[dp] |
| 24 | writ | DO ← a |
| 25 | fnsh | a sign indicating that output data are generated, en·inv ← en·inv − Eb, en ← en + (incremental/decremental value), ck ← Ccal |

The basic instructions will be described below with reference to Table 1. The ra·a instruction is a basic instruction for setting the value of data in the register a to "0", i.e., clearing the data in the register a. The xr·a instruction is a basic instruction for inverting the low-order bit of the register a. The sf·a instruction is a basic instruction for shifting the bit train (e.g., 16 bits) of the register a toward the high-order bit thereof and setting the low-order bit to "0". The de·a and in·a instructions are basic instructions for decrementing and incrementing, respectively, the value of data in the register a by "1". The a·ab instruction is a basic instruction for storing the sum of the value of data in the register a and the value of data in the register b in the register a.

The s·ab instruction is a basic instruction for subtracting the value of data in the register b from the value of data in the register a, storing the difference in the register a, and setting only particular bits p, n, z in the register f to "1", i.e., setting a flag, depending on whether the difference is positive (a−b>0), negative (a−b<0), or "0" (a−b=0). The br·p, br·n, br·z instructions are basic instructions for incrementing the value of address data in the register gp by "2" if each of the bits p, n, z in the register f is "1".

The m·am and m·ma instructions are basic instructions for storing data from the registers a, mp respectively in the registers mp, a. The de·m and in·m instructions are basic instructions for decrementing and incrementing, respectively, the value of data in the register mp by "1".

The m·Ma instruction is a basic instruction for storing data from the register at an address of the working memory MR which is indicated by the data in the register mp. The ftch and oprd instructions are basic instructions for storing data from an address of the working memory MR which is indicated by the data in the register mp respectively in the registers gp, a, and incrementing the value of address data in the register mp by "1". The ftch instruction corresponds to a jump instruction.

The m·ad and m·da instructions are basic instructions for storing data from the registers a, dp respectively in the registers dp, a. The de·d and in·d instructions are basic instructions for decrementing and incrementing, respectively, the value of data in the register dp by "1".

The read instruction is a basic instruction (reading instruction) for reading partial input data $d_k$ of the input data DI stored at an address of the data base 1 which is indicated by the data in the register dp, into the register a. The writ instruction is a basic instruction (writing instruction) for writing the data in the register a as generated output data DO into the data storage areas $D_n$ of the data base 1.

The fnsh instruction is a basic instruction (processing completion instruction) for causing the agent $AGT_i$ to recognize the storage of generated output data DO in the data storage areas $D_n$ of the data base 1, subtracting a predetermined value Eb from the value of data in the register en·inv, storing the difference in the register en·inv, adding an incremental or decremental energy value established through the input/output terminal device 4 to an energy value represented by the data in the register en, storing the sum in the register en, and initializing the value of data in the register ck with a predetermined value Ccal.

A program to be generated, i.e., a program for generating output data with respect to input data, is composed of these basic instructions arranged in a suitable sequence.

In this embodiment, each of the basic instructions is represented by a 5-bit binary code, for example. The total number of 5-bit binary codes available is $2^5=32$, which is greater than the total number (25) of the above basic instructions. Each of the 32 5-bit binary codes is assigned such that it corresponds to either one of the 25 basic instructions. Therefore, some of the 25 basic instructions are represented by two or more 5-bit binary codes corresponding thereto.

A process of generating a program with the apparatus according to the present invention will be described below.

Figure 4:
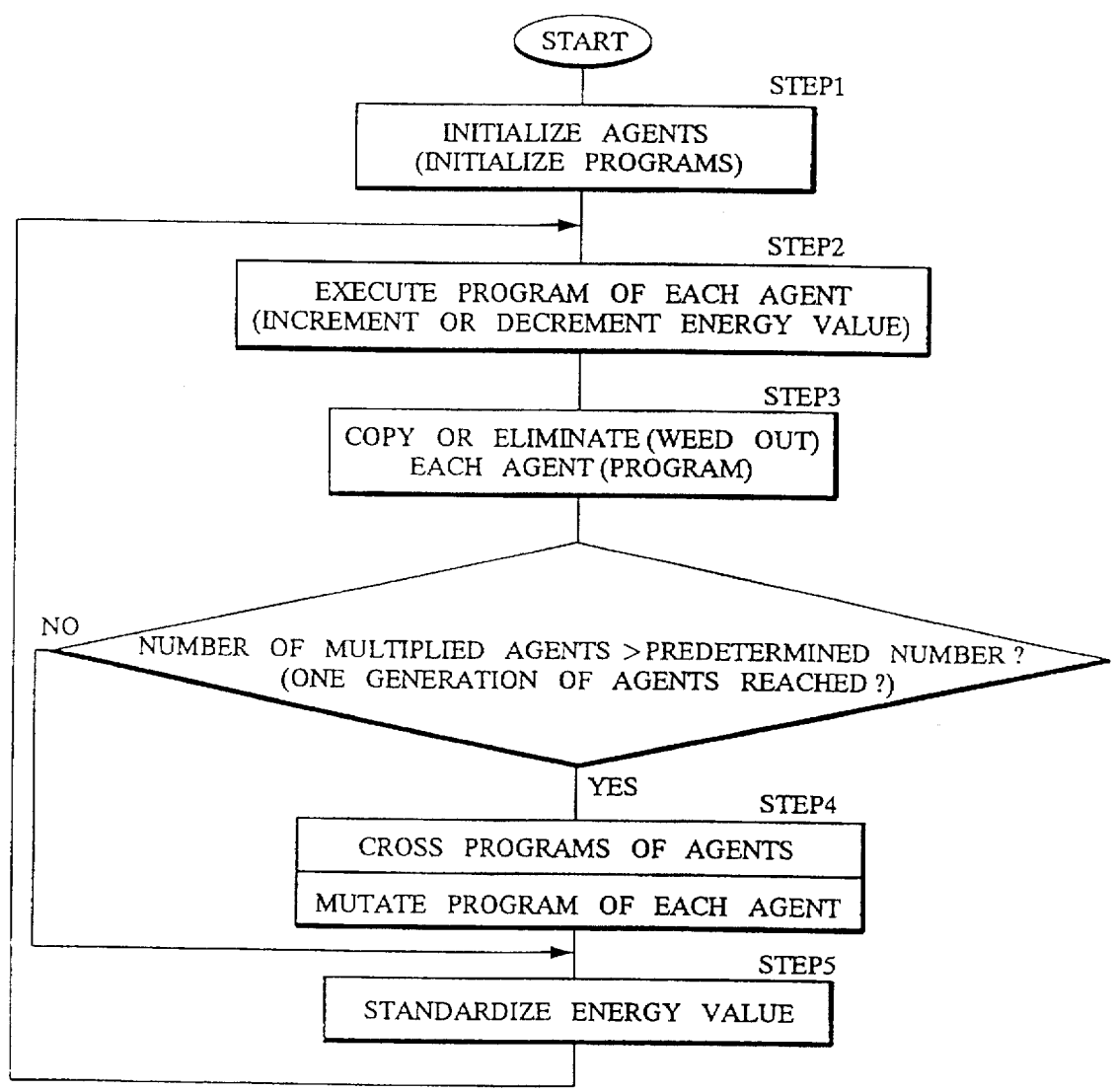
FIG. 4 is a flowchart of an operation sequence of the apparatus shown in FIG. 1.

As shown in FIG. 4, each agent $AGT_i$ (i=0, 1, . . . ) is initialized by the processing/supervising unit 3 in a STEP1. The initialization is effected on a predetermined number of agents $AGT_i$, e.g., 256 agents $AGT_i$, of the computer group 2 as follows:

The data of the 5-bit binary codes which represent the basic instructions are randomly stored in the addresses of the memory GN of each of the agents $AGT_i$. The memory GN of each of the agents $AGT_i$ now stores a program which is composed of an optional sequence of basic instructions, forming a group of as many programs as the number of agents $AGT_i$. In this embodiment, the number of addresses of the memory GN, i.e., the number of basic instructions of each of the programs, is 96, for example.

Similarly, the processing/supervising unit 3 stores the address data from the memory GN randomly in the addresses of the memory MR0 of each of the agents $AGT_i$. The data stored in the memory MR0 is copied into the memory MR.

The registers of each of the agents $AGT_i$ are initialized as follows: The registers dp, gp, mp which store address data are initialized to "0" address data, the flag register f is initialized to "0" flag value, and the general-purpose registers a, b are initialized to random data. The register en which stores the data of an energy value indicative of the quality level of each program stored in the memory GN is initialized to the same energy value, e.g., of 32, for any of the agents $AGT_i$.

Since the programs in the agents $AGT_i$ thus initialized are each composed of a random sequence of basic instructions, the programs may not contain the read instruction, the writ instruction, and the fnsh instruction which will certainly be required to generate output data with respect to input data, and may contain a plurality of fnsh instructions.

Then, each of the initialized agents $AGT_i$ executes the program in the memory GN using registers, etc., in accordance with commands from the processing/supervising unit 3 in a STEP2.

Specifically, when each of the initialized agents $AGT_i$ starts to execute the program, it initializes the value of data in the register ck with the predetermined value Ccal (ck←Ccal). The predetermined value Ccal is used to limit the number of times that the basic instructions of each program are executed, as described later on, and is set to "200", for example.

Furthermore, when each of the initialized agents $AGT_i$ starts to execute the program, it sets the value of data in the register en·inv to en·inv←Kxen, and subtracts the value of data in the register en·inv from the energy value in the register en (en←en−en·inv) where "en" represents the energy value stored in the register en at the time the program starts to be executed, and "K" is a predetermined proportionality constant, e.g., 0.1 in this embodiment. The value of data in the register en·inv is now set to a value proportional to the energy value at the time the program starts to be executed, i.e., 1/10 of the energy value at the time the program starts to be executed, and the energy value in the register en is reduced by the value of data in the register en·inv. The value of data in the register en·inv serves to define the number of times that the fnsh instruction is executed depending on the energy value at the time the program starts to be executed.

When each of the programs starts being executed, the input data DI is given from the data base 1 through the processing/supervising unit 3 to each of the agents $AGT_i$. Specifically, the processing/supervising unit 3 randomly selects one of the data storage regions $D_n$ of the data base 1, and gives the input data DI in the selected one of the data storage regions $D_n$ from the data base 1 to each of the agents $AGT_i$. When each of the programs starts being executed, the generated output data DO corresponding to the input data DI from the selected one of the data storage regions $D_n$ is initialized to "0".

With the memory MR and the registers ck, en·inv thus initialized and the input data DI given to the agents $AGT_i$, each of the agents $AGT_i$ starts executing the program.

More specifically, each of the agents $AGT_i$ executes one, at a time, of the basic instructions of the program which are stored in the respective addresses of the memory GN, according to the address data stored in the register gp. Basically, each time each of the agents $AGT_i$ executes one basic instruction, it increments the address data in the register gp by "1" (gp←gp+1). Therefore, the agent $AGT_i$ executes the basic instructions of the program stored in the memory GN successively from the basic instruction at the address "0" (the first address of the program).

However, when the agent $AGT_i$ executes the br·p, br·n, and br·z instructions, it may increment the address data stored in the register gp by "2" (gp←gp+1). At this time, the agent $AGT_i$ does not execute the basic instructions at the addresses that follow the br·p, br·n, and br·z instructions. When the agent $AGT_i$ executes the ftch instruction, it forcibly rewrites the address data in the register gp with address data indicated by the ftch instruction, and successively executes the basic instructions following the basic instruction at the rewritten address.

Figure 5:
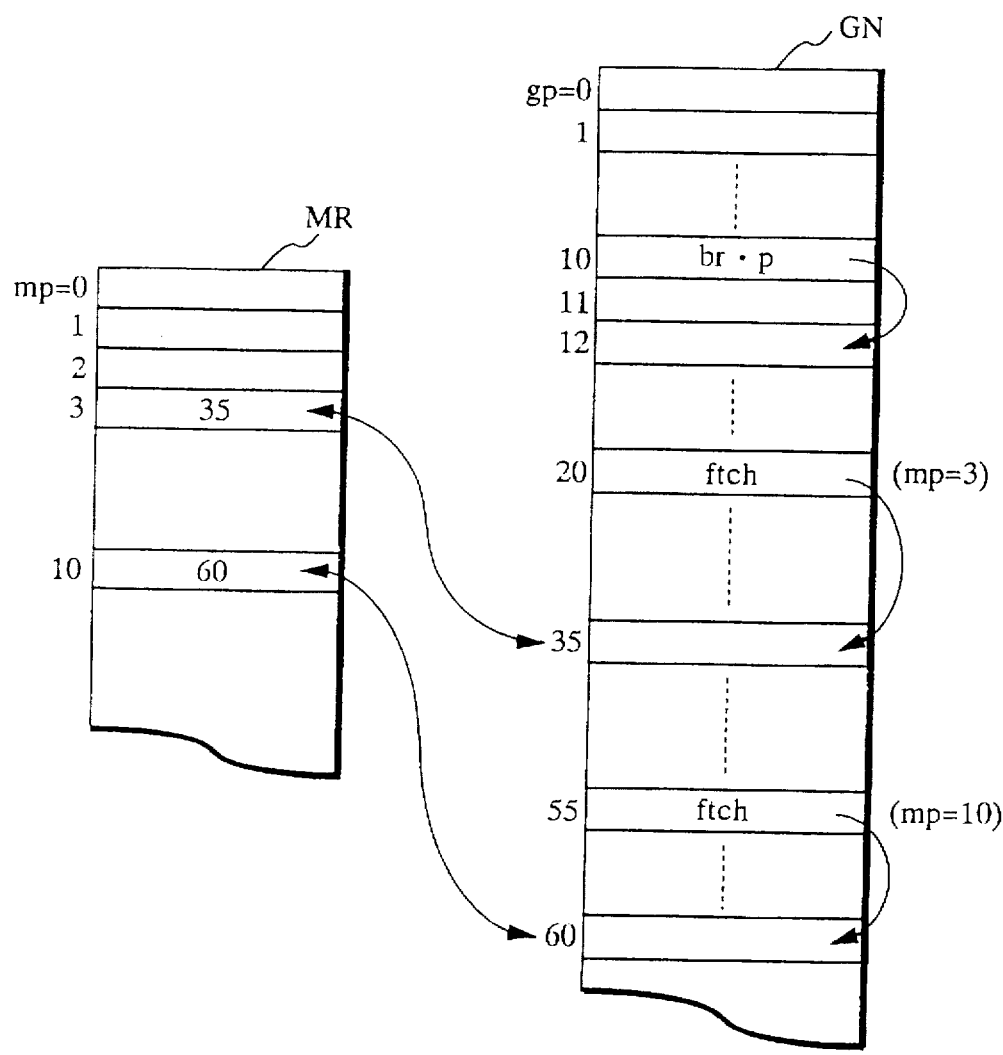
FIG. 5 is a diagram showing the manner in which a program including ftch instructions (jump instructions) is executed.

More specifically, it is assumed, as shown in FIG. 5, that the br·p instruction is stored at the "10" address of the memory GN in the course of execution of the program in the memory GN successively from the basic instruction at the "0" address. If the p bit of the flag register f is "1" when the agent $AGT_i$ executes the br·p instruction (at this time gp=10), then the agent $AGT_i$ sets the address data in the register gp to "12" (gp←gp+2), and then executes the basic instruction at the "12" address, rather than the basic instruction at the "11" address, after the br·p instruction.

If the ftch instruction is stored in the "20" address of the memory GN and the value of data in the register mp is "3" when the agent $AGT_i$ executes the br·p instruction (at this time gp=20), then the agent $AGT_i$ writes the address data, i.e., "35", stored in the "3" address of the memory MR into the register gp (gp←MR[mp]), and successively executes the basic instructions following the basic instruction at the "35" address of the memory GN after the ftch instruction. If the ftch instruction is stored in the "55" address of the memory GN and the value of data in the register mp is "10" when the agent $AGT_i$ executes the ftch instruction in the course of successive execution of the basic instructions from the basic instruction at the "35" address, then the agent $AGT_i$ writes the address data, i.e., "60", stored in the "10" address of the memory MR into the register gp, and successively executes the basic instructions following the basic instruction at the "60" address of the memory GN after the ftch instruction. This means that the basic instructions from the "35" address to the "55" addresses are executed as a subroutine.

When the address data in the register gp reaches the final address in the memory GN, the agent $AGT_i$ resets the address data in the register gp to "0", and executes the program again from the basic instruction at the "0" address of the memory GN.

When the program starts being executed, the data in the memory MR is copied from the data in the memory MR0 which stores the address data from the memory GN in the STEP1 (see FIG. 4). The memory MR serves to not only store the address data from the memory GN, but also as a working memory when the m·Ma and oprd instructions of the basic instructions are executed.

Upon execution of the program, the agent $AGT_i$ decrements the data indicative of the number of times stored in the register ck each time it executes one basic instruction (ck←ck−1). Therefore, when the number of times that basic instructions are executed reaches the predetermined value Ccal (=200), the data indicative of the number of times stored in the register ck becomes "0". When the data indicative of the number of times stored in the register ck becomes "0", the agent $AGT_i$ finishes the execution of the program.

When the agent $AGT_i$ executes the fnsh instruction before the data indicative of the number of times stored in the register ck becomes "0", the data indicative of the number of times stored in the register ck is initialized to the predetermined value Ccal again as described above with reference to Table 1.

When the agent $AGT_i$ executes the read instruction upon execution of the program, the agent $AGT_i$ reads the partial input data $d_k$ corresponding to the address data in the data base 1 from among the input data DI in the selected storage region $D_n$ of the data base 1, through the processing/supervising unit 3 into the register a. In order to generate accurate output data with respect to the input data DI, it is necessary to read all the partial input data $d_k$ contained in the input data DI. The partial input data $d_k$ are read in such a manner when as many read instructions as the number of partial input data $d_k$ are executed as the address data in the register dp is suitably modified by the de-d instruction, etc. (see Table 1). The partial input data $d_k$ read into the register a are suitably processed when the xr-a instruction, etc. are executed.

When the agent $AGT_i$ executes the writ instruction, the agent $AGT_i$ stores the data which is stored in the register a at the time, as generated output data DO with respect to the input data DI, into the data storage region $D_n$ of the data base 1 which corresponds to the input data DI through the processing/supervising unit 3.

Each time the agent $AGT_i$ executes the fnsh instruction contained in the program, the agent $AGT_i$ decrements the value of data in the register en-inv, i.e., the value of data initialized to a value proportional to the energy value (the value of data in the register en) at the time the program starts being executed, by the predetermined value Eb, e.g., of "1" (en-inv←en-inv−Eb).

At the same time, the agent $AGT_i$ upon execution of the fnsh instruction determines that generated output data with respect to the input data DI has been obtained, and outputs a sign indicating that generated output data with respect to the input data DI has been obtained, to the processing/supervising unit 3. At this time, the processing/supervising unit 3 outputs the generated output data DO stored in the data storage region $D_n$ of the data base 1, together with the reference output data SDO stored in the data storage region $D_n$ correspondingly to the input data DI, to the input/output terminal device 4. The operator, for example, then compares the generated output data DO and the reference output data SDO with each other through the input/output terminal device 4, and the energy value in the register en is incremented or decremented through the input/output terminal device 4, the data base 1, and the processing/supervising unit 3 depending on the degree to which the output data DO, SDO agree with each other (en←en+(incremental/decremental value). Basically, the greater the degree to which the output data DO, SDO agree with each other, the energy value in the register en is more incremented, and the smaller the degree to which the output data DO, SDO agree with each other, the energy value in the register en is more decremented. The energy value should preferably be incremented or decremented in order to satisfy certain conditions, as described later on.

When the agent $AGT_i$ executes the fnsh instruction, the processing/supervising unit 3 newly selects one of the data storage regions $D_n$ of the data base 1, and gives the input data in the selected data storage region $D_n$ to the agent $AGT_i$. At the same time, the agent $AGT_i$ increments or decrements the energy value unless the value of data in the register en-inv which is decremented by the predetermined value Eb upon execution of the fnsh instruction is decremented to "0", and thereafter executes the basic instruction at the address following the fnsh instruction. When the value of data in the register en-inv is decremented to "0", the agent $AGT_i$ finishes the execution of the program.

In the STEP2 shown in FIG. 4, the above execution of the program is carried out successively by the agents $AGT_i$ under the command of the processing/supervising unit 3. At this time, each of the agents $AGT_i$ continuously executes the basic instructions of the program until the data indicative of the number of times in the register ck falls to "0" or the value of data in the register en-inv falls to "0" by executing the fnsh instruction.

Therefore, the execution of the program by each of the agents $AGT_i$ is finished when the number of times that the basic instructions are executed reaches the predetermined value Ccal (=200) without the fnsh instruction being executed. Since the value of data in the register en-inv is proportional to the energy value at the time the program starts to be executed, the agent $AGT_i$ continuously executes the program until the value of data in the register en-inv which is decremented by the predetermined value Eb upon execution of the fnsh instruction falls to "0", so that the agent $AGT_i$ executes as many fnsh instructions contained in the program as the number of times depending on the energy value at the time of starting to execute the program unless the data indicative of the number of times in the register ck becomes "0". As the energy value at the time of starting to execute the program is higher, the number of times that the fnsh instruction is executed is greater, and new input data is given each time the fnsh instruction is executed. In the agent $AGT_i$ which has finished the execution of the program, the register en is set to (en←en+en-inv), and the register en-inv is set to (en-inv←0).

Upon completion of the above execution of each program, the selection executing unit 6 of the processing/supervising unit 3 copies or eliminates the program depending on the energy value corresponding to the program in the agent $AGT_i$, i.e., the value of data stored in the register en after the execution of the program is finished, in a STEP3 shown in FIG. 4.

In this embodiment, an agent $AGT_i$ in which the corresponding energy value is "0" is eliminated together with the program. Specifically, the data of the program stored in the memory GN and the memory MR0 are eliminated from that agent $AGT_i$.

From an agent $AGT_i$ in which the corresponding energy value is greater than a predetermined value Ea, e.g., of "5", the program is copied to other agents $AGT_j$ of the computer group 2. Specifically, the data in the memory GN, the memory MR0, the register en, etc. of the agent $AGT_i$ are copied to the memories GN, the memories MR0, the registers en, etc. of the other agents $AGT_j$ which do not store the program. In each of the agents $AGT_j$ which newly stores the program, the copied data in the memory MR0 is further copied to the memory MR. The register id is given an identification code different from the identification code of the agent $AGT_i$ from which the data are copied. The energy value held in the agent $AGT_i$ from which the data are copied is divided into two halves between the agents $AGT_i$ from and to which the data are copied.

An agent $AGT_i$ in which the energy value is equal or smaller than the predetermined value Ea and not "0" remains as it is.

When an agent $AGT_i$ is copied or eliminated in the manner described above, such an agent $AGT_i$ which has gained a relatively large energy value through incrementation upon execution of the program, i.e., such an agent $AGT_i$ which has a superior program that generates output data DO that agrees with the reference output data SDO with a higher degree with respect to the input data DI, is multiplied.

On the other hand, such an agent $AGT_i$ which has an inferior program that only generates output data DO that agrees with the reference output data SDO with a lower degree with respect to the input data DI, is removed.

After an agent $AGT_i$ is copied or eliminated as described above, if the number of multiplied or copied agents $AGT_i$ is in excess of an initially determined number (256) of agents $AGT_i$, then, treating the initially determined number of agents $AGT_i$ as one generation of agents $AGT_i$, the data in the memories GN, MR0 of the agents $AGT_i$ are crossed and mutated by the crossing executing unit 7 and the mutation executing unit 8 of the processing/supervising unit 3 in a STEP4 shown in FIG. 4. If the number of multiplied agents $AGT_i$ is smaller than the initially determined number (256) of agents $AGT_i$, then the STEP2 and the STEP3 are repeated.

The crossing executing unit 7 crosses data as follows:

First, pairs of agents $AGT_i$ (crossing pairs) which are to cross data are selected randomly in terms of probability at a given crossing ratio Rcrs from a group of agents $AGT_i$ which store programs. The crossing ratio Rcrs signifies the proportion of the agents $AGT_i$ which are involved in crossing data in the group of agents $AGT_i$. In this embodiment, the crossing ratio Rcrs is set to 0.3 (30%), for example. Specifically, if the total number of agents $AGT_i$ in the group is "100", then 30 agents $AGT_i$ (15 crossing pairs), which are 30% on the average of the total number of agents $AGT_i$, are selected as those agents $AGT_i$ which are involved in crossing data. Since, however, crossing pairs of agents $AGT_i$ are selected randomly in terms of probability, not 30% of the total number of agents $AGT_i$ are necessarily selected at all times.

Figure 6:
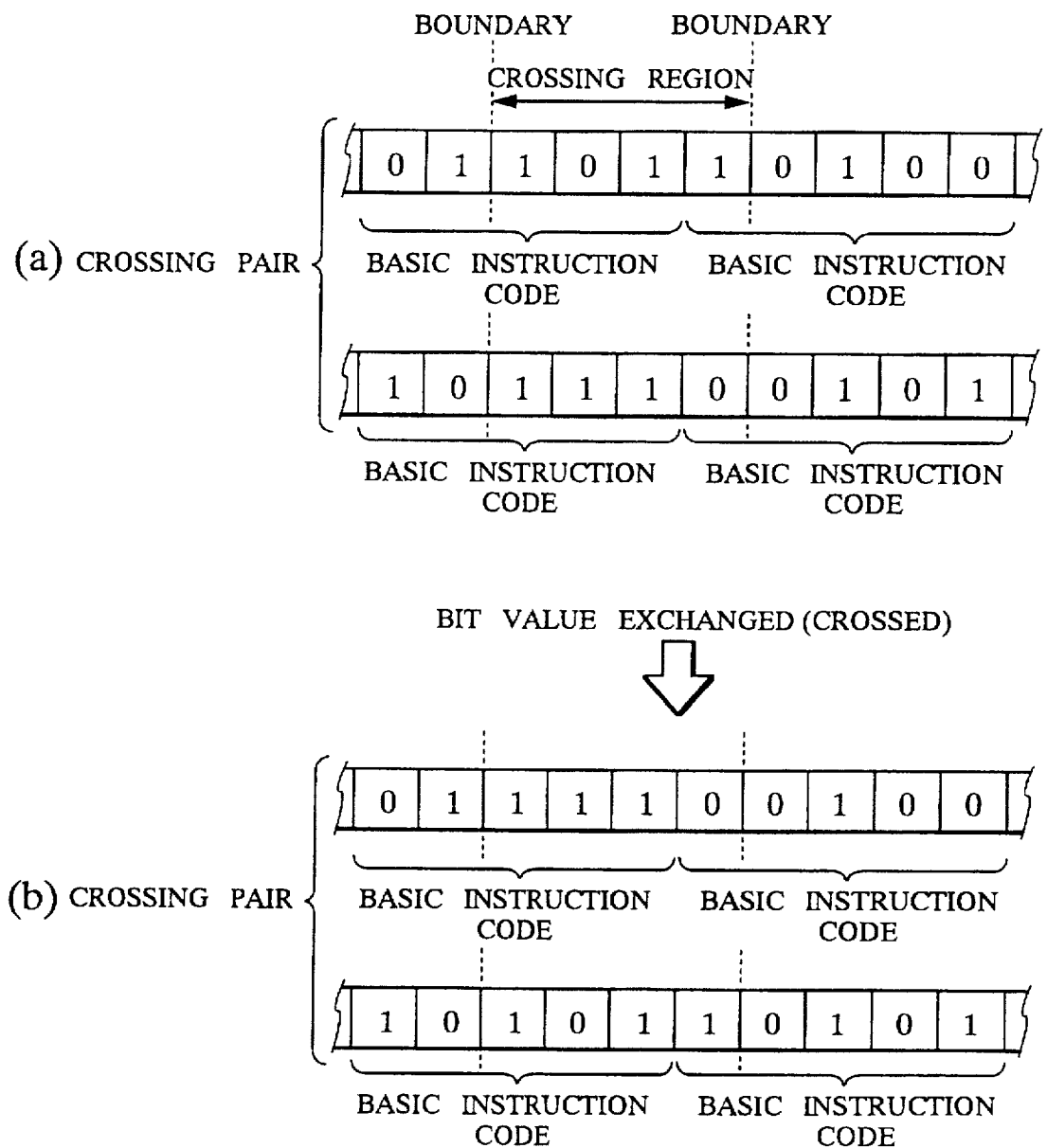
FIGS. 6(a) and 6(b) are diagrams illustrative of a program crossing.

The data (programs) in the memories GN are crossed between the selected crossing pairs of agents $AGT_i$ as follows:

As shown in FIG. 6(a), upper and lower bit trains are illustrative of 5-bit binary codes (basic instruction codes) representing basic instructions of the programs of a crossing pair, the 5-bit binary codes being arranged serially successively in the order of addresses of the memories GN. For crossing the programs, boundaries are established with a given probability Pcrs between bits of respective basic instruction codes. The probability Pcrs is a probability with which to establish a boundary in one basic instruction code, and is set to "1" in this embodiment. Therefore, one boundary on the average is established in each basic instruction code. The position of a boundary in each basic instruction code is determined randomly. In FIG. 6(a), a boundary is established between second and third bits of the left-hand basic instruction code, and a boundary is established between first and second bits of the next right-hand basic instruction code.

Having thus established boundaries, the crossing executing unit 7 exchanges bit trains between the programs of the crossing pair, i.e., changes a bit train (crossing region) between the adjacent boundaries shown in FIG. 6(a) to a bit train shown in FIG. 6(b), for thereby crossing the programs of the crossing pair. When the programs of the crossing pair are thus crossed, the basic instruction in the crossing region in each of the programs of the crossing pair changes to another basic instruction. Therefore, each of the programs of the crossing pair newly contains a series of basic instructions which have not been contained.

Such data crossing is also effected in the same manner on the data (address data) in the memories MR0 of the crossing pair.

The programs of the crossing pair may be crossed by exchanging basic instructions from a certain address to another address in the memories GN between the programs. This holds true for data crossing on the data (address data) in the memories MR0 of the crossing pair.

Figure 7:
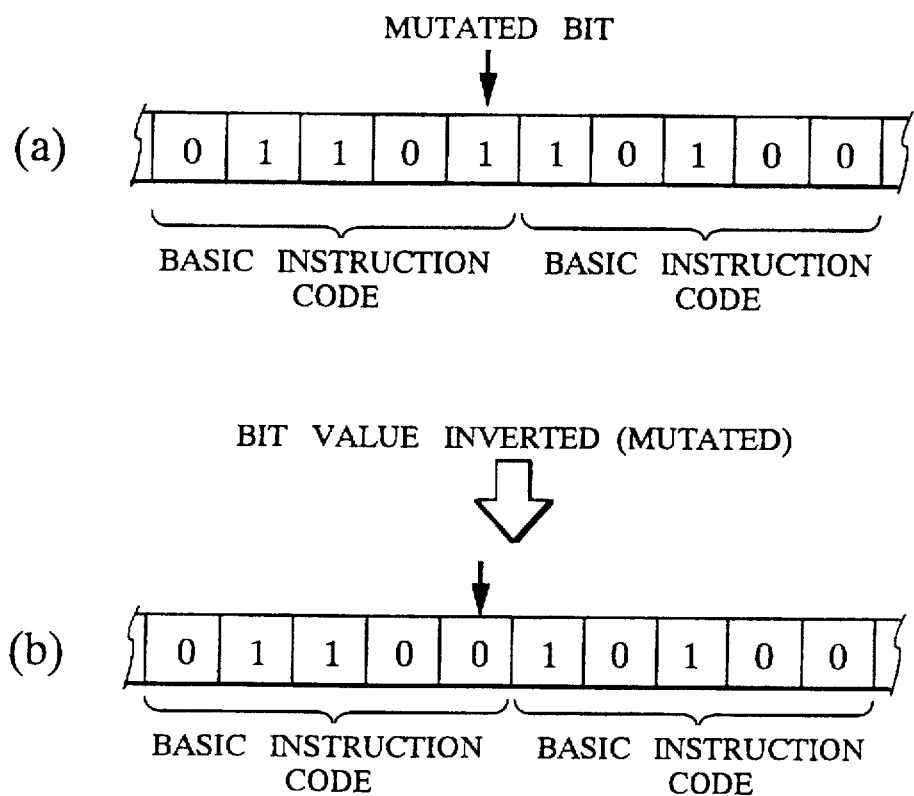
FIGS. 7(a) and 7(b) are diagrams illustrative of a program mutation.

The mutation executing unit 8 mutates data as follows:

As shown in FIG. 7(a), a bit train is illustrative of 5-bit binary codes (basic instruction codes) representing basic instructions of the program of each agent $AGT_i$, the 5-bit binary codes being arranged serially successively in the order of addresses of the memory GN. The program is mutated by inverting the bits of the bit train with a predetermined probability Pmut as shown in FIG. 7(b). The probability Pmut is a probability with which the value of each bit is inverted. In this embodiment, the probability Pmut is set to "0.005", for example, signifying that the values of 5 bits per 1000 bits on the average (1 bit per 200 bits) of the bit train of a program are inverted. Specifically, since one program comprises a bit train of 5×96 addresses= 480 bits in this embodiment, the number of bits of the program whose values are inverted by the mutation executing unit 8 ranges from 2 to 3 on the average. Such a mutation is effected on each of the programs by the mutation executing unit 8.

When such a mutation occurs, a basic instruction corresponding to a basic instruction code which contains a bit with its value inverted is mutated into a different basic instruction.

The above mutation is also carried out on the address data in the memory MR0 of each of the agents $AGT_i$.

Each of the programs may be mutated by selecting several basic instructions in terms of probability from the basic instructions that make up the program, and randomly mutating the selected basic instructions into other basic instructions. This holds true for data mutation on the address data in the memory MR0.

After the above crossing and mutation step, the energy value (the value of data in the memory en) corresponding to each of the agents $AGT_i$ is standardized in a STEP5 such that the total amount of energy values is kept at a constant value (given total amount) equal to the total amount (256×32= 8192 in this embodiment) of energy values established depending on the programs in the STEP1. The energy value is standardized by distributing the total amount of energy values to the programs at proportions proportional to the energy values that are presently stored in the registers en for the respective programs, and then storing the distributed energy values in the respective registers en. The energy value is thus standardized for the reason of preventing the energy value from being infinitely reduced or increased depending on the program capability of the agent $AGT_i$.

Subsequently, the processing from the STEP2 to the STEP5, i.e., the execution of the program by each of agents $AGT_i$, the copying or elimination thereof, the crossing and mutation thereof, and the standardization of the energy value, is repeated for thereby generating an agent $AGT_i$ which has a superior program that generates output data DO that agrees with the reference output data SDO with a higher degree with respect to the various input data DI in the data base 1, and also multiplying such an agent $AGT_i$ so that it will be eventually prevalent in the group of agents $AGT_i$.

More specifically, when each program is executed, an energy value corresponding to an agent $AGT_i$ having a program for generating output data DO that agrees with the reference output data SDO with a high degree with respect to input data DI given at the time upon execution of the fnsh instruction, and writing the generated output data DO in the data base 1 according to the writ instruction, is increased each time the fnsh instruction is executed, and such an agent AGT$_i$ is copied or eliminated depending on the magnitude of the energy value, and remains and multiplied in the computer group 2. While the STEP2 is being repeated after the STEP 3 through the STEP5, an energy value corresponding to an agent AGT$_i$ having a program for generating output data DO that agrees with the reference output data SDO with a low degree with respect to input data DI given at the time upon execution of each of the programs is reduced, and hence the agent AGT$_i$ is copied or eliminated in the STEP3, and thereafter eliminated (weeded out). For example, an agent AGT$_i$ having a program that does not contain the read instruction for reading input data DI (such a program can be generated upon initialization in the STEP1 or crossing or mutation in the STEP4) will eventually be eliminated or weeded out as the program fails to generate accurate output data DO with respect to various input data DI.

It would not be possible to leave and multiply an agent AGT$_i$ having a program better than a program for generating most accurate output data DO among the programs first generated in the STEP1, simply by copying or eliminating an agent AGT$_i$. However, a program for generating more accurate output data DO can be obtained by crossing and mutating the data in the STEP4 from time to time.

Specifically, some basic instructions change to other basic instructions in a program which has been subjected to a crossing or mutation as described above. When some basic instructions are thus changed, an arrangement of basic instructions (hereinafter referred to as a "functional block") effective to generate more accurate output data DO may be generated in a suitable portion of the program. For instance, if the xr·a instruction, the m·ba instruction, and the a·ab instruction of the basic instructions have to be arranged in the order named on a low-order side of the read instruction for generating more accurate output data DO, then such an arrangement of the instructions serves as a functional block.

If the number of agents AGT$_i$ having a program containing such a functional block is small in the crossing step, then when the program is crossed with another program, it may be crossed with a program containing no functional block with a high probability, and hence the functional block of the program may be broken also with a high probability. However, the program may not necessarily be crossed with another program at all times, and if the program is not crossed with another program, then the program is copied in the STEP3 and multiplied. When the number of programs containing such a functional block is increased to a certain extent, programs containing a functional block may be crossed with each other with a high probability. For this reason, and since the crossing is an exchange between some basic instruction codes at corresponding regions of the programs, the functional blocks of these programs are maintained. Inasmuch as a program containing a functional block generates more accurate output data DO with respect to various input data DI than a program which contains no functional block, the program containing a functional block gains a higher energy value when the program is executed in the STEP2. Consequently, an agent AGT$_i$ having a program containing such a functional block is copied in the STEP3, and is multiplied and becomes prevalent in the group of agents AGT$_i$.

In the mutating step, when a mutation occurs in a functional block of a program, the functional block is broken, and therefore an agent AGT$_i$ having a program containing such a broken functional block is eliminated in the STEP3 and weeded out. If a mutation occurs in a portion of a program other than a functional block thereof, then since the program remains rather than being eliminated, the mutated portion remains in the program.

While a mutation may generate a program having an effective functional block, it generally breaks a program having a functional block and modifies it into an inferior program with a high probability. Therefore, the probability that such a mutation occurs is set to a substantially small value ($<<1$) in order to allow a functional block to grow beyond a certain length.

In the crossing step, mutated portions accumulated in a portion of a program other than a functional block by the mutating process while maintaining such a functional block may be crossed to generate a new functional block more effective to generate more accurate output data DO, in the portion other than the functional block. Since the program with such a new functional block generated therein can generate more accurate output data DO, the program gains a higher energy value when the program is executed in the STEP2. Consequently, an agent AGT$_i$ having such a program is copied in the STEP3, and is multiplied and becomes prevalent in the group of agents AGT$_i$.

In this manner, an agent AGT$_i$ which has a superior program that generates output data DO that agrees with the reference output data SDO with a higher degree with respect to the input data DI, is generated and multiplied until finally a program for generating optimum output data DO with respect to the input data DI is generated. Because the operator is only required to increment or decrement the energy value and the processing/supervising unit 3 automatically carries out other processing, the manual labor needed to generate a program is minimized.

In the execution of a program in the STEP2, the fnsh instruction is executed a number of times depending on the energy value at the time the program starts being executed, i.e., the energy value which is gained by an agent AGT$_i$ that finally has the program when the program is executed in a preceding cycle, and new input data DI is given each time the fnsh instruction is executed. Consequently, an agent AGT$_i$ that has an inferior program which does not generate accurate output data DO with respect to various input data DI is quickly weeded out (eliminated) in the STEP3, and an agent AGT$_i$ that has a superior program which generates accurate output data DO with respect to various input data DI is copied in the STEP3 and quickly multiplied.

Specifically, each program generates output data DO with respect to input data DI when suitable basic instructions including the read instruction and the writ instruction are executed before the fnsh instruction is executed, and the energy value is incremented or decremented when the fnsh instruction is executed. At this time, even if the degree with which the output data DO and the reference output data SDO agree with each other is high, it depends on given input data DI, and accurate output data DO may often not be generated with respect to other input data DI by the above group of basic instructions. Therefore, even if a relatively large energy value is gained when the program is executed once, it may have been gained because the input data DI given upon execution of the program is certain particular input data DI. Since the program containing such a group of basic instructions is unable to generate accurate output data DO with respect to various input data DI, the program should be weeded out quickly.

In the this embodiment, the fnsh instruction is executed a number of times depending on the energy value at the time the program starts being executed, and new input data DI is given each time the fnsh instruction is executed. Therefore, an agent AGT$_i$ which has gained a relatively large energy value upon execution of the program in a preceding cycle executes the above group of basic instructions an increased number of times, and is given new input data DI each time the group of basic instructions is executed.

If the above group of basic instructions is capable of generating accurate output data DO with respect to various input data DI, then the energy value of the program which contains the group of basic instructions is increased each time the fnsh instruction is executed, and the program gains a greater energy value, so that the program can be copied and multiplied in the STEP3 with greater ease. Conversely, if the above group of basic instructions is incapable of generating accurate output data DO with respect to only particular input data DI, then the energy value of the program which contains the group of basic instructions is often reduced each time the fnsh instruction is executed, and the energy value eventually falls to "0", so that the program is weeded out in the STEP3. Consequently, an agent $AGT_i$ which has a superior program is quickly multiplied, and an agent $AGT_i$ which has an inferior program is quickly weeded out, with the result that a superior program can be generated more quickly.

In this embodiment, when the data indicative of the number of times stored in the register ck becomes "0" upon execution of each program, i.e., when the number of times that basic instructions are executed reaches the predetermined value Ccal after the execution of the program is started until the fnsh instruction is executed, or after an fnsh instruction is executed until a next fnsh instruction is executed, the execution of the program is finished. Therefore, the execution of the program is prevented from continuing infinitely in the case where the program contains an arrangement of basic instructions forming an infinite loop.

Furthermore, when the ftch instruction is executed upon execution of each program, the basic instructions following the basic instruction at the address based on the address data copied from the memory MR0 to the memory MR are executed as a subroutine. The arrangement of the basic instructions as the subroutine basically depends on the address data stored in the memory MR0, and when the address data stored in the memory MR0 becomes suitable for the program while programs are being copied or eliminated, and crossed or mutated, a subroutine program appropriate for generating accurate output data DO may be produced in the program.

In this embodiment, the address data in the memory MR0, are crossed and mutated in the manner described above while the programs in the memories GN are crossed and mutated. In this manner, a program containing a subroutine program appropriate for generating accurate output data DO is generated in the memory GN of each of the agents $AGT_i$.

For multiplying an agent $AGT_i$ having a program for generating accurate output data DO until it becomes prevalent in the group of agents $AGT_i$, it is preferable to give an energy value to each of agents $AGT_i$ in a manner to satisfy certain conditions when each of the programs is executed.

Specifically, if a group of agents $AGT_i$ is composed of agents $AGT_i$ each having a program containing a functional block (an arrangement of basic instructions) effective to generate accurate output data DO and agents $AGT_i$ each having a program containing no such functional block, then when the programs are executed, each of the programs containing a functional block (referred to as a "superior program") gains a greater energy value than the programs containing no such functional block (referred to as an "inferior program"). Therefore, in the STEP3, an agent $AGT_i$ having a superior program is copied and multiplied, and an agent $AGT_i$ having an inferior program remains as it is or is eliminated. Therefore, after agents have been copied or eliminated, the proportion of superior programs in the entire group, i.e., the ratio of the number of superior programs to the entire number of programs, is greater than it was before agents have been copied or eliminated.

It is assumed that, as a result of the copying or eliminating step, the number of superior programs changes from N0 to N0sel and the number of inferior programs changes from Na to Nasel, and the rate of change (rate of increase) N0sel/N0 of the number of superior programs is (1+s) times (s>0) the rate of change Nasel/Na of the number of inferior programs. After the copying or eliminating step, the proportion Y0sel (=N0sel/(N0sel+Nasel), 0<Y0sel<1) of the number N0sel of superior programs in the total number (N0sel+Nasel) of programs in the group is expressed according to the following equation, using the proportion Y0 (=N0/(N0+Na)) of the number N0 of superior programs in the total number (N0+Na) of programs in the group before being copied or eliminated:

$$Y0sel = Y0\ (1+s)/(1+sY0) \tag{1}$$

where the denominator of the right side represents the total number of programs in the group after being copied or eliminated, and the numerator of the right side represents the number of superior programs after being copied or eliminated.

The symbol "s" in the above equation is a parameter indicating the extent to which superior programs are multiplied by being copied over inferior programs. A program is copied or eliminated depending on the energy value gained when the program is executed, and upon execution of the program, the energy value of a superior program is incremented or decremented so as to gain an energy value greater than that of an inferior program. The symbol "s" is basically a quantity proportional to the magnitude of the energy value that is increased when the program is executed.

It is assumed that the probability that a functional block of a superior program is broken, i.e., the probability that an optional basic instruction in a functional block is mutated into another basic instruction, in the mutating step, is indicated by u (u<<1). Since the probability that an optional arrangement of basic instructions of an inferior program is mutated into an arrangement of basic instructions serving as a functional block is about "0", the proportions Y0, Y0mut of superior programs in the group respectively before and after a mutation takes place satisfy the following equation:

$$Y0mut = Y0\ (1-u) \tag{2}$$

where "u" is proportional to the probability Pmut described above with respect to the mutation.

If it is assumed that the proportions of superior programs in the group respectively before and after a crossing takes place are represented respectively by Y0, Y0crs, then the proportions Y0, Y0crs satisfy the following equation:

$$Y0crs = (1-Rcrs)Y0 = Rcrs\ [Y0^2 + Y0\ (1-Y0)Ppres] \tag{3}$$

where Rcrs is the crossing ratio described above, and Ppres is the probability that a functional block of a superior program remains unbroken when the superior program and an inferior program are crossed with each other as a crossing pair, the probability Ppres depending strongly on Y0.

While a detailed process of deriving the equation (3) is not described here, "(1−Rcrs)Y0" in the first term of the right side of the equation (3) represents the proportion of the number of those superior programs which are not involved in the crossing step, i.e., which are not crossed, of all superior programs before being crossed in the entire group, as is evident from the definition of the crossing ratio. "Rcrs [Y0²+Y0 (1−Y0)Ppres]" in the second term of the right side of the equation (3) represents the proportion of the number of those superior programs which are involved in the crossing step and have functional blocks maintained after being crossed, of all superior programs before being crossed in the entire group. The equation (3) shows that the sum of the first and second terms of the right side thereof is equal to the proportion Y0 of the number of superior programs after being crossed in the entire group.

The second term of the right side of the equation (3) will be described in greater detail below. When a superior program is involved in the crossing step and its functional block is maintained, either superior programs are crossed as a crossing pair with each other or superior and inferior programs are crossed as a crossing pair with each other with a functional block being maintained. Crossing inferior programs each other can be ignored because the probability that a superior program having a functional block will be generated is small. "Y0²" in the bracket of the second term of the right side of the equation (3) represents the proportion of the total number of combinations of superior programs as crossing pairs in the total number of all combinations of programs possible as crossing pairs in the group of programs before being crossed. In such crossing pairs, the functional block of each superior program is always maintained, i.e., the probability that the functional block of each superior program is maintained is "1". "Y0 (1 −Y0)" in the bracket of the second term of the right side of the equation (3) represents ½ of the proportion of the total number of combinations of superior and inferior programs as crossing pairs in the total number of all combinations of programs possible as crossing pairs in the group of programs before being crossed. In such crossing pairs, the functional block of a superior program is maintained insofar as the superior and inferior programs are crossed with each other in portions not related to the functional blocks of superior programs. Therefore, "Y0 (1−Y0)Ppres" which indicates the product of "Y0 (1−Y0)" and the probability Pres that the functional block of a superior program is maintained when the superior program and an inferior program are crossed with each other at portions not related to the functional block, represents the proportion of superior programs obtained from crossing pairs of superior and inferior programs.

Consequently, the sum of "Y0²" and "Y0 (1−Y0)Ppres" represents the proportion of superior programs involved in the crossing step and functional blocks thereof which are maintained, in the total number of all combinations of programs as crossing pairs. The second term of the right side of the equation (3), which represents the product of the sum of "Y0²" and "Y0 (1−Y0)Ppres" and the crossing rate "Rcrs", indicates the proportion of the number of superior programs which are involved in the crossing step and whose functional blocks are maintained after the crossing step, in the total number of programs in the group.

From the equations (1)–(3), the proportion Y0' of superior programs in the group after the copying or eliminating step and the mutating or crossing step has been carried out is expressed by the following equation, using the proportion Y0 of superior programs in the group before those steps are carried out:

$$Y0' = Y0 \cdot Asel \cdot Amut \cdot Acrs \tag{4}$$

where

Asel=(1+s)/(1+sY0),

Amut=1−u, and

Acrs=(1−Rcrs)+Rcrs [Y0+(1+Y0)Pres].

Since the present invention resides basically in that superior programs are generated and multiplied in the group of programs, it is necessary that the proportion of superior programs in the group be increased after the copying or eliminating step and the mutating or crossing step has been carried out, i.e., it is necessary that the condition: ΔY0= Y0'−Y0>0 be satisfied. As can be seen from the equation (4), the above condition is equivalent to the inequality: Asel·Amut·Acrs>1. Using Ppres≈0, Y0<<1, the above inequality can be modified into:

$$(1+s)(1-Rcrs)(1-u) > 1 \tag{5}$$

Specifically, in this embodiment, the crossing rate "Rcrs" and "u" are set to Rcrs=0.3 and u=0.005 (=Ppres), respectively. In order to satisfy the inequality (5), "s" must be in the rang of s>0.44. If "s"=0.5, then the inequality (5) is satisfied. This means that, as is apparent from the above definition of "s", when the energy value corresponding to each program is incremented or decremented in the execution of the program before the copying or eliminating step such that the rate of change (rate of increase) N0sel/N0 of the number of superior programs becomes 1.5 times, for example, the rate of change Nasel/Na of the number of inferior programs in the copying or eliminating step, superior programs are multiplied in the group of agents AGT$_i$ until they are prevalent in the group.

Although a certain preferred embodiment of the present invention has been shown and described in detail, it should be understood that various changes and modifications may be made therein without departing from the scope of the appended claims.

What is claimed is:

1. An apparatus for generating a program, comprising:

program storing means for storing a plurality of programs each composed of an arrangement of basic instructions of plural types required to generate output data with respect to given input data of given types;

energy value storing means for storing data indicative of an energy value indicative of the quality level of each of the programs;

a computer for executing each of the programs until a predetermined condition is satisfied;

input data imparting means for giving said input data to said computer when the computer executes each of the programs;

energy value setting means for setting an energy value to increment or decrement the energy value corresponding to each of the programs which is stored in said energy value storing means depending on the degree with which the output data generated by each of the programs executed by said computer and reference output data predetermined with respect to said input data agree with each other;

selecting means for copying or eliminating each of the programs depending on the magnitude of the energy value stored in said energy storing means and storing a plurality of programs generated by copying or eliminating each of the programs into said program storing means, after the execution of each of the programs by said computer is finished;

crossing means for crossing the programs stored in said program storing means with a predetermined probability; and mutating means for mutating the programs stored in said program storing means with a predetermined probability;

said energy value setting means having means for setting the energy value corresponding to each of the programs so as to increment the energy value when the agreement between the generated output data and the reference output data increases;

said computer, said selecting means, said crossing means, and said mutating means having respective means for repeatedly executing each of the programs, copying or eliminating each of the programs, crossing the programs, and mutating each of the programs to generate a program for generating output data with respect to the input data with a high degree of agreement with said reference output data, in said programs stored in said program storing means.

2. An apparatus according to claim 1, wherein said crossing means comprises means for selecting at least a pair of programs as a crossing pair from said plurality of programs with a predetermined probability, and crossing the selected programs by exchanging a portion of an arrangement of basic instructions or a bit train of each of the selected programs with a predetermined probability.

3. An apparatus according to claim 1, wherein said mutating means comprises means for mutating each of the programs by either changing a basic instruction of an arrangement of basic instructions of each of the programs to another basic instruction with a predetermined probability or inverting the value of a bit of a bit train of each of the programs with a predetermined probability.

4. An apparatus according to claim 1, wherein said computer comprises means for finishing execution of each of the programs when the number of times that the basic instructions of each of the programs are executed reaches a predetermined number.

5. A method of generating a program, comprising the steps of:

generating a plurality of programs each composed of an arrangement of basic instructions of plural types required to generate output data with respect to given input data of given types;

executing each of the programs with a computer until a predetermined condition is satisfied and giving the input data to said computer;

comparing output data generated with respect to the input data when each of the programs is executed, with reference output data predetermined with respect to said input data, and incrementing or decrementing an energy value indicative of the quality level of each of the programs such that the energy value is greater as the agreement between the generated output data and the reference output data increases;

copying or eliminating each of the programs depending on the magnitude of the energy value after the execution of each of the programs by said computer is finished;

crossing the programs with a predetermined probability; and mutating the programs with a predetermined probability;

said steps of executing, incrementing or decrementing, copying or eliminating, crossing, and mutating being repeated to generate a program for generating output data with respect to the input data with a high degree of agreement with said reference output data.

6. A method according to claim 5, wherein said step of crossing comprises the steps of selecting at least a pair of programs as a crossing pair from said plurality of programs with a predetermined probability, and crossing the selected programs by exchanging a portion of an arrangement of basic instructions or a bit train of each of the selected programs with a predetermined probability.

7. A method according to claim 5, wherein said step of mutating comprises the step of mutating each of the programs by either changing a basic instruction of an arrangement of basic instructions of each of the programs to another basic instruction with a predetermined probability or inverting the value of a bit of a bit train of each of the programs with a predetermined probability.

8. A method according to claim 5, wherein said step of executing comprises the step of finishing execution of each of the programs when the number of times that the basic instructions of each of the programs are executed reaches a predetermined number.

9. An apparatus for generating a program, comprising:

program storing means for storing a plurality of programs each composed of an arrangement of basic instructions of plural types required to generate output data with respect to given input data of given types;

energy value storing means for storing data indicative of an energy value indicative of the quality level of each of the programs;

a computer for executing each of the programs until a predetermined condition is satisfied;

input data imparting means for giving said input data to said computer when the computer executes each of the programs;

energy value setting means for setting an energy value to increment or decrement the energy value corresponding to each of the programs which is stored in said energy value storing means depending on the degree with which the output data generated by each of the programs executed by said computer and reference output data predetermined with respect to said input data agree with each other;

selecting means for copying or eliminating each of the programs depending on the magnitude of the energy value stored in said energy storing means and storing a plurality of programs generated by copying or eliminating each of the programs into said program storing means, after the execution of each of the programs by said computer is finished;

crossing means for crossing the programs stored in said program storing means with a predetermined probability; and mutating means for mutating the programs stored in said program storing means with a predetermined probability;

said energy value setting means having means for setting the energy value corresponding to each of the programs so as to increment the energy value when the agreement between the generated output data and the reference output data increases;

said computer, said selecting means, said crossing means, and said mutating means having respective means for repeatedly executing each of the programs, copying or eliminating each of the programs, crossing the programs, and mutating each of the programs to generate a program for generating output data with respect to the input data with a high degree of agreement with said reference output data, in said programs stored in said program storing means;

said basic instructions include an input data reading instruction for reading the input data and a processing completion instruction for indicating the generation of the output data, said computer comprising means for executing said processing completion instruction a number of times depending on said energy value at the time of starting to execute each of the programs when each of the programs is executed, said input data imparting means comprising means for giving new input data to said computer each time said processing completion instruction is executed when each of the programs is executed by said computer.

10. An apparatus according to claim 9, wherein said crossing means comprises means for selecting at least a pair of programs as a crossing pair from said plurality of programs with a predetermined probability, and crossing the selected programs by exchanging a portion of an arrangement of basic instructions or a bit train of each of the selected programs with a predetermined probability.

11. An apparatus according to claim 9, wherein said mutating means comprises means for mutating each of the programs by either changing a basic instruction of an arrangement of basic instructions of each of the programs to another basic instruction with a predetermined probability or inverting the value of a bit of a bit train of each of the programs with a predetermined probability.

12. An apparatus according to claim 9, wherein said computer comprises means for finishing execution of each of the programs when the number of times that the basic instructions of each of the programs are executed reaches a predetermined number.

13. An apparatus for generating a program, comprising:
program storing means for storing a plurality of programs each composed of an arrangement of basic instructions of plural types required to generate output data with respect to given input data of given types;
energy value storing means for storing data indicative of an energy value indicative of the quality level of each of the programs;
a computer for executing each of the programs until a predetermined condition is satisfied;
input data imparting means for giving said input data to said computer when the computer executes each of the programs;
energy value setting means for setting an energy value to increment or decrement the energy value corresponding to each of the programs which is stored in said energy value storing means depending on the degree with which the output data generated by each of the programs executed by said computer and reference output data predetermined with respect to said input data agree with each other;
selecting means for copying or eliminating each of the programs depending on the magnitude of the energy value stored in said energy storing means and storing a plurality of programs generated by copying or eliminating each of the programs into said program storing means, after the execution of each of the programs by said computer is finished;
crossing means for crossing the programs stored in said program storing means with a predetermined probability; and
mutating means for mutating the programs stored in said program storing means with a predetermined probability;
said energy value setting means having means for setting the energy value corresponding to each of the programs so as to increment the energy value when the agreement between the generated output data and the reference output data increases;
said computer, said selecting means, said crossing means, and said mutating means having respective means for repeatedly executing each of the programs, copying or eliminating each of the programs, crossing the programs, and mutating each of the programs to generate a program for generating output data with respect to the input data with a high degree of agreement with said reference output data, in said programs stored in said program storing means;
said crossing means and said mutating means comprise respective means for crossing the programs and mutating the programs, respectively, when the number of programs copied by said selecting means reaches at least a predetermined number.

14. An apparatus according to claim 13, wherein said crossing means comprises means for selecting at least a pair of programs as a crossing pair from said plurality of programs with a predetermined probability, and crossing the selected programs by exchanging a portion of an arrangement of basic instructions or a bit train of each of the selected programs with a predetermined probability.

15. An apparatus according to claim 13, wherein said mutating means comprises means for mutating each of the programs by either changing a basic instruction of an arrangement of basic instructions of each of the programs to another basic instruction with a predetermined probability or inverting the value of a bit of a bit train of each of the programs with a predetermined probability.

16. An apparatus according to claim 13, wherein said computer comprises means for finishing execution of each of the programs when the number of times that the basic instructions of each of the programs are executed reaches a predetermined number.

17. An apparatus for generating a program, comprising:
program storing means for storing a plurality of programs each composed of an arrangement of basic instructions of plural types required to generate output data with respect to given input data of given types;
energy value storing means for storing data indicative of an energy value indicative of the quality level of each of the programs;
a computer for executing each of the programs until a predetermined condition is satisfied;
input data imparting means for giving said input data to said computer when the computer executes each of the programs;
energy value setting means for setting an energy value to increment or decrement the energy value corresponding to each of the programs which is stored in said energy value storing means depending on the degree with which the output data generated by each of the programs executed by said computer and reference output data predetermined with respect to said input data agree with each other;
selecting means for copying or eliminating each of the programs depending on the magnitude of the energy value stored in said energy storing means and storing a plurality of programs generated by copying or eliminating each of the programs into said program storing means, after the execution of each of the programs by said computer is finished;
crossing means for crossing the programs stored in said program storing means with a predetermined probability.

mutating means for mutating the programs stored in said program storing means with a predetermined probability; and address data storing means for storing address data representing an address of at least one of the basic instructions of each of the programs stored in said program storing means;

said energy value setting means having means for setting the energy value corresponding to each of the programs so as to increment the energy value when the agreement between the generated output data and the reference output data increases;

said computer, said selecting means, said crossing means, and said mutating means having respective means for repeatedly executing each of the programs, copying or eliminating each of the programs, crossing the programs, and mutating each of the programs to generate a program for generating output data with respect to the input data with a high degree of agreement with said reference output data, in said programs stored in said program storing means;

said basic instructions including a jump instruction for shifting the execution of the program to the basic instruction at the address represented by the address data stored in said address data storing means when each of the programs is executed by said computer;

said selecting means comprising means for copying or eliminating the address data stored in said address data storing means in association with each of said programs when each of said programs is copied or eliminated;

said crossing means comprising means for crossing the address data stored in said address data storing means with a predetermined probability in association with the programs when the programs are crossed;

said mutating means comprising means for mutating the address data stored in said address data storing means with a predetermined probability in association with each of said programs when each of said programs is mutated.

18. An apparatus according to claim 7, wherein said crossing means comprises means for selecting at least a pair of programs as a crossing pair from said plurality of programs with a predetermined probability, and crossing the selected programs by exchanging a portion of an arrangement of basic instructions or a bit train of each of the selected programs with a predetermined probability.

19. An apparatus according to claim 17, wherein said mutating means comprises means for mutating each of the programs by either changing a basic instruction of an arrangement of basic instructions of each of the programs to another basic instruction with a predetermined probability or inverting the value of a bit of a bit train of each of the programs with a predetermined probability.

20. An apparatus according to claim 17, wherein said computer comprises means for finishing execution of each of the programs when the number of times that the basic instructions of each of the programs are executed reaches a predetermined number.

21. A method of generating a program, comprising the steps of:

generating a plurality of programs each composed of an arrangement of basic instructions of plural types required to generate output data with respect to given input data of given types;

executing each of the programs with a computer until a predetermined condition is satisfied and giving the input data to said computer;

comparing output data generated with respect to the input data when each of the programs is executed, with reference output data predetermined with respect to said input data, and incrementing or decrementing an energy value indicative of the quality level of each of the programs such that the energy value is greater as the agreement between the generated output data and the reference output data increases;

copying or eliminating each of the programs depending on the magnitude of the energy value after the execution of each of the programs by said computer is finished;

crossing the programs with a predetermined probability; and mutating the programs with a predetermined probability;

said steps of executing, incrementing or decrementing, copying or eliminating, crossing, and mutating being repeated to generate a program for generating output data with respect to the input data with a high degree of agreement with said reference output data;

said basic instructions include an input data reading instruction for reading the input data and a processing completion instruction for indicating the generation of the output data, said steps of executing and giving comprising the steps of executing said processing completion instruction a number of times depending on said energy value at the time of starting to executing each of the programs when each of the programs is executed, and giving new input data to said computer each time said processing completion instruction is executed.

22. A method according to claim 21, wherein said step of crossing comprises the steps of selecting at least a pair of programs as a crossing pair from said plurality of programs with a predetermined probability, and crossing the selected programs by exchanging a portion of an arrangement of basic instructions or a bit train of each of the selected programs with a predetermined probability.

23. A method according to claim 21, wherein said step of mutating comprises the step of mutating each of the programs by either changing a basic instruction of an arrangement of basic instructions of each of the programs to another basic instruction with a predetermined probability or inverting the value of a bit of a bit train of each of the programs with a predetermined probability.

24. A method according to claim 21, wherein said step of executing comprises the step of finishing execution of each of the programs when the number of times that the basic instructions of each of the programs are executed reaches a predetermined number.

25. A method of generating a program, comprising the steps of:

generating a plurality of programs each composed of an arrangement of basic instructions of plural types required to generate output data with respect to given input data of given types;

executing each of the programs with a computer until a predetermined condition is satisfied and giving the input data to said computer;

comparing output data generated with respect to the input data when each of the programs is executed, with reference output data predetermined with respect to said input data, and incrementing or decrementing an energy value indicative of the quality level of each of the programs such that the energy value is greater as the agreement between the generated output data and the reference output data increases;

copying or eliminating each of the programs depending on the magnitude of the energy value after the execution of each of the programs by said computer is finished;

crossing the programs with a predetermined probability; and mutating the programs with a predetermined probability;

said steps of executing, incrementing or decrementing, copying or eliminating, crossing, and mutating being repeated to generate a program for generating output data with respect to the input data with a high degree of agreement with said reference output data;

said steps of crossing and mutating comprising the step of crossing the programs and mutating the programs, respectively, when the number of copied programs reaches at least a predetermined number.

26. A method according to claim 25, wherein said step of crossing comprises the steps of selecting at least a pair of programs as a crossing pair from said plurality of programs with a predetermined probability, and crossing the selected programs by exchanging a portion of an arrangement of basic instructions or a bit train of each of the selected programs with a predetermined probability.

27. A method according to claim 25, wherein said step of mutating comprises the step of mutating each of the programs by either changing a basic instruction of an arrangement of basic instructions of each of the programs to another basic instruction with a predetermined probability or inverting the value of a bit of a bit train of each of the programs with a predetermined probability.

28. A method according to claim 25, wherein said step of executing comprises the step of finishing execution of each of the programs when the number of times that the basic instructions of each of the programs are executed reaches a predetermined number.

29. A method of generating a program, comprising the steps of:

generating a plurality of programs each composed of an arrangement of basic instructions of plural types required to generate output data with respect to given input data of given types;

executing each of the programs with a computer until a predetermined condition is satisfied and giving the input data to said computer;

comparing output data generated with respect to the input data when each of the programs is executed, with reference output data predetermined with respect to said input data, and incrementing or decrementing an energy value indicative of the quality level of each of the programs such that the energy value is greater as the agreement between the generated output data and the reference output data increases;

copying or eliminating each of the programs depending on the magnitude of the energy value after the execution of each of the programs by said computer is finished;

crossing the programs with a predetermined probability; and mutating the programs with a predetermined probability;

said steps of executing, incrementing or decrementing, copying or eliminating, crossing, and mutating being repeated to generate a program for generating output data with respect to the input data with a high degree of agreement with said reference output data;

said step of generating comprising the step of establishing position data representing a position of at least one of the basic instructions of each of the programs in association with each of the programs;

said basic instructions including a jump instruction for shifting the execution of the program to the basic instruction at the position represented by the position data established in said step of establishing when each of the programs is executed by said computer;

said step of selecting comprising the step of copying or eliminating the position data in association with each of said programs when each of said programs is copied or eliminated;

said step of crossing comprising the step of crossing the position data with a predetermined probability in association with the programs when the programs are crossed;

said step of mutating comprising the step of mutating the position data with a predetermined probability in association with each of said programs when each of said programs is mutated.

30. A method according to claim 29, wherein said step of crossing comprises the steps of selecting at least a pair of programs as a crossing pair from said plurality of programs with a predetermined probability, and crossing the selected programs by exchanging a portion of an arrangement of basic instructions or a bit train of each of the selected programs with a predetermined probability.

31. A method according to claim 29, wherein said step of mutating comprises the step of mutating each of the programs by either changing a basic instruction of an arrangement of basic instructions of each of the programs to another basic instruction with a predetermined probability or inverting the value of a bit of a bit train of each of the programs with a predetermined probability.

32. A method according to claim 29, wherein said step of executing comprises the step of finishing execution of each of the programs when the number of times that the basic instructions of each of the programs are executed reaches a predetermined number.

* * * * *